United States Patent [19]
Otani et al.

[11] Patent Number: 5,994,421
[45] Date of Patent: *Nov. 30, 1999

[54] WATER-ABSORBENT RESIN DISPERSION AND POLYURETHANE COMPOSITION

[75] Inventors: Kazuya Otani; Masahiro Matsuoka; Kohei Maeda; Kozaburo Nagata; Takao Ando; Toru Nakanishi; Isao Ishikawa; Takayuki Tsuji, all of Kyoto, Japan

[73] Assignee: Sanyo Chemical Industries, Ltd., Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,772

[22] PCT Filed: Oct. 23, 1995

[86] PCT No.: PCT/JP95/02171

§ 371 Date: Jun. 4, 1997

§ 102(e) Date: Jun. 4, 1997

[87] PCT Pub. No.: WO96/12767

PCT Pub. Date: May 2, 1996

[30] Foreign Application Priority Data

Oct. 24, 1994 [JP] Japan ..................................... 6-284208
Mar. 7, 1995 [JP] Japan ..................................... 7-077241

[51] Int. Cl.$^6$ .................................................. C08L 75/00
[52] U.S. Cl. .............................. 521/137; 521/64; 521/67; 521/71; 521/72; 524/457; 524/458; 524/459; 524/460; 524/504; 524/507
[58] Field of Search ..................... 524/457, 458, 524/459, 460, 507, 504; 521/64, 67, 71, 72, 137

[56] References Cited

U.S. PATENT DOCUMENTS

| | | | |
|---|---|---|---|
| 4,076,663 | 2/1978 | Masuda et al. | 260/17.4 GC |
| 4,146,488 | 3/1979 | Martin | 252/34.7 |
| 4,320,040 | 3/1982 | Fujita et al. | 524/459 |
| 4,340,706 | 7/1982 | Obayashi et al. | 526/207 |
| 4,701,474 | 10/1987 | Bailey, Jr. et al. | 524/762 |
| 4,826,917 | 5/1989 | Kondo et al. | 525/59 |
| 5,032,659 | 7/1991 | Heidel | 527/300 |
| 5,087,513 | 2/1992 | Kim | 428/283 |
| 5,252,690 | 10/1993 | Ahmed et al. | 526/258 |
| 5,326,808 | 7/1994 | Floyd et al. | 524/457 |
| 5,336,711 | 8/1994 | Schneider et al. | 524/507 |
| 5,422,392 | 6/1995 | Floyd et al. | 524/457 |
| 5,480,934 | 1/1996 | Messner et al. | 524/457 |

FOREIGN PATENT DOCUMENTS

| | | |
|---|---|---|
| 0 119 349 A2 | 9/1984 | European Pat. Off. . |
| 0 165 074 A2 | 12/1985 | European Pat. Off. . |
| WO 91/17195 | 11/1991 | WIPO . |

*Primary Examiner*—Judy M. Reddick
*Attorney, Agent, or Firm*—Pollock, Vande Sande & Amernick

[57] ABSTRACT

A water-absorbent resin dispersion comprising a water-absorbent resin (B) or a hydrous gel thereof dispersed in a liquid or heat-meltable organic active-hydrogen compound (A), wherein said resin (B) is formed by the polymerization of a water-soluble monomer or its precursor and a cross-linker and/or a polysaccharide in the compound (A); and a process for producing a polyurethane resin by the reaction of the dispersion with an organic polyisocyanate compound. As the polyurethane resin is excellent in the capacity and rate of absorption, it is useful as absorbent articles such as paper diaper and sanitary goods, humidity modifiers, cutoff material, and so forth.

7 Claims, No Drawings

WATER-ABSORBENT RESIN DISPERSION AND POLYURETHANE COMPOSITION

TECHNICAL FIELD

The present invention relates to a water-absorbent resin dispersion and a process for producing a polyurethane resin. More particularly, the invention relates to a water-absorbent resin dispersion characterized by a small particle diameter of the dispersoid and good dispersion stability and to a process for producing a polyurethane resin using said dispersion.

BACKGROUND ART

It is known to use a polymeric polyol as part of the polyol component for the production of a polyurethane resin. Japanese Kokai Publication Sho-54-133599, for instance, discloses the use of a hydrophilic vinyl monomer in the production of such a polymeric polyol. Though polymeric polyols obtainable by using an non-hydrophilic vinyl monomer such as styrene and acrylonitrile have been demonstrated to give stable dispersions, no comparable information is available about polymeric polyols obtainable with a hydrophilic vinyl monomer. Meanwhile, a dispersion obtainable by mixing a high-molecular-weight polyol with a water-absorbent resin is known.

However, when a hydrophilic vinyl monomer is used in the production process disclosed in Japanese Kokai Publication Sho-54-133599, a stable dispersion can hardly be obtained. Moreover, the mere admixture of a high-molecular-weight polyol and a water-absorbent resin has the drawback that the water-absorbent resin is liable to undergo cohesion and precipitation.

SUMMARY OF THE INVENTION

The inventors of the present invention did much research to develop a water-absorbent resin dispersion, which is endowed with a small particle diameter of the dispersoid and good dispersion stability and is easy to manufacture, and have ultimately perfected the present invention.

The present invention, therefore, is directed to a water-absorbent resin dispersion comprising a water-absorbent resin (B) or a hydrous gel thereof dispersed in a liquid or heat-meltable active hydrogen-containing organic compound (A), wherein said (B) is formed by in situ polymerization of a water-soluble monomer or a precursor thereof and a crosslinking agent and/or a polysaccharide in said (A); a polyurethane composition comprising a water-absorbent resin (B) or a hydrous gel thereof dispersed with a mean dispersoid particle diameter of 0.01 to 100 $\mu$m in a polyurethane, wherein said (B) is formed by polymerization of a water-soluble monomer or a precursor thereof and a crosslinking agent and/or a polysaccharide in a polyol which is a precursor of said polyurethane; a process for producing a polyurethane resin comprising subjecting said dispersion to reaction with an organic polyisocyanate compound; and a process for producing a polyurethane foam which comprises subjecting said dispersion and organic polyisocyanate compound to reaction in the presence of a blowing agent, optionally together, a catalyst, a foam-conditioning agent, and other additives.

DETAILED DISCLOSURE OF THE INVENTION

In the present invention, the liquid or heat-meltable active hydrogen-containing organic compound (A) includes compounds containing alcoholic-hydroxyl group, compounds containing phenolic-hydroxyl group, compounds containing carboxyl group, compounds containing thiol group, and compounds containing amino group.

The compounds containing alcoholic-hydroxyl group may for example be polyether monohydric alcohols and polyols. Among them, polyols are preferred.

The polyether monohydric alcohol includes a variety of compounds available upon addition of alkylene oxides to compounds each containing one active hydrogen atom (e.g. aliphatic, alicyclic, or aralkyl alcohols having 1 to 20 carbon atoms, monophenols, dialkylamines, morpholine, etc.). Also included are those ethers (e.g. methyl ethers, isopropyl ethers, phenyl ethers, etc.) and ester compounds (e.g. acetic esters and benzoic esters) which are available upon partial blocking of hydroxyl groups with alcohols or carboxylic acids.

The polyol includes polyether polyols, polyester polyols, polyols each having a backbone chain of carbon-carbon bonds, and amino-terminated polyols. Aside from them, the compounds described in Polyurethane Resin Handbook (Keiji Iwata (ed.), Nikkan Kogyo Shinbun Sha, 1987) at pages 99 et seq. can be mentioned. Also included are the etherification or esterification reaction products available upon partial blocking of the hydroxyl groups of such polyols with alcohols or carboxylic acids. Preferred, among these polyols, are polyether polyols and polyester polyols.

The polyether polyol includes polyoxyalkylene polyols. The polyoxyalkylene polyols includes those compounds which are available upon addition of alkylene oxides to compounds each containing at least 2 (preferably 2 to 8) active hydrogen atoms (e.g. polyhydric alcohols, polyphenols, amines, polycarboxylic acids, phosphoric acid, etc.) and mixtures thereof. Preferred, among them, are polyhydric alcohols.

The polyhydric alcohol includes di- through octahydric alcohols. The dihydric alcohol (diol) includes alkylene glycols such as ethylene glycol, diethylene glycol, propylene glycol, 1,3- or 1,4-butanediol, 1,6-hexanediol, neopentyl glycol, etc., cyclohexanediol, xylylene glycol, and so on. In addition, as diols containing cyclic groups, there can be mentioned 2,2,4,4-tetramethylcyclobutane-1,3-diol, 1,3-cyclopentanediol, 1,4-cyclohexanediol, 1,4-bis (hydroxymethyl) cyclohexane, 4,4'-methylenebis (cyclohexanol), 4,4'-isopropylidenebis(cyclohexanol), p-phenylenedi($\beta$-hydroxyethyl ether),p-phenylenedi($\beta$-hydroxypropyl ether), 4,4'-methylenebis($\beta$-hydroxyethyl phenyl ether), 4,4'-isopropylidenebis ($\beta$-hydroxyethyl phenyl ether), 4,4'-isopropylidenebis($\beta$-hydroxypropyl phenyl ether), etc. The trihydric alcohol (triol) includes glycerol, trimethylolpropan e, trimethylol ethane, hexanetriol, triethanolamine, etc. The tetrahydric alcohol (tetrol) includes pentaerythritol, methylene glycoside, diglycerol, etc. As penta- and polyhydric alcohols, there can be mentioned pentitols such as adonitol, arabitol, xylytol, etc., hexitols such as sorbitol, mannitol, iditol, talitol, dulcitol, etc.; sugars inclusive of monosaccharides such as glucose, mannose, fructose, sorbose, etc. and oligosaccharides such as sucrose, trehalose, lactose, raffinose, etc.; glycosides of various glycols such as ethylene glycol, propylene glycol, etc., glycerol, trimethylolpropane, hexanetriol, etc.; polyglycerols such as triglycerol, tetraglycerol, etc.; polypentaerythritols such as dipentaerythritol, tripentaerythritol, etc.; tetrakis(hydroxymethyl)cyclohexanol, etc.

The polyphenol includes monocyclic polyphenols such as pyrogallol, hydroquinone, phloroglucinol, etc.; bisphenols such as bisphenol A, bisphenol sulfone, etc.; phenol-formaldehyde condensate (Novolac) such as the polyphenols described in U.S. Pat. No. 3,265,641.

The amine includes ammonia, aliphatic amines, alicyclic amines, heterocyclic amines, and aromatic amines. The aliphatic amine includes alkanolamines such as mono-, di-, and tri-ethanolamines, isopropanol amine, aminoethylethanolamine, etc.; alkylamines having 1 to 20 carbon atoms; alkylenediamines having 2 to 6 carbon atoms such as ethylenediamine, propylenediamine, hexamethylenediamine, etc.; and polyalkylenepolyamines such as diethylenetriamine, triethylenetetramine, etc. The alicyclic amine includes isophoronediamine, cyclohexylenediamine, dicyclohexylmethanediamine, etc.

The heterocyclic amine includes piperazine and alkyl-substituted piperazines such as methylpiperazine, ethylpiperazine, propylpiperazine, butylpiperazine, hexylpiperazine, dimethylpiperazine, diethylpiperazine, dipropylpiperazine, dibutylpiperazine, dihexylpiperazine, tetramethylpiperazine, etc.; piperidine and alkyl-substituted piperidines such as methylpiperidine, ethylpiperidine, propylpiperidine, butylpiperidine, hexylpiperidine, dimethylpiperidine, diethylpiperidine, dipropylpiperidine, dibutylpiperidine, dihexylpiperidine, tetramethylpiperidine, etc.; imidazolidine and alkyl-substituted imidazolidines such as methylimidazolidine, ethylimidazolidine, propylimidazolidine, butylimidazolidine, dimethylimidazolidine, diethylimidazolidine, dipropylimidazolidine, dibutylimidazolidine, etc.; pyrazolidine and alkyl-substituted pyrazolidines such as methylpyrazolidine, ethylpyrazolidine, propylpyrazolidine, butylpyrazolidine, dimethylpyrazolidine, diethylpyrazolidine, dipropylpyrazolidine, dibutylpyrazolidine, etc.; imidazole and alkyl-substituted imidazoles such as methylimidazole, ethylimidazole, propylimidazole, butylimidazole, dimethylimidazole, diethylimidazole, dipropylimidazole, dibutylimidazole, etc.; pyrazole and alkyl-substituted pyrazoles such as methylpyrazole, ethylpyrazole, propylpyrazole, butylpyrazole, dimethylpyrazole, diethylpyrazole, dipropylpyrazole, dibutylpyrazole, etc; pyrazoline and alkyl-substituted pyrazolines such as methylpyrazoline, ethylpyrazoline, propylpyrazoline, butylpyrazoline, dimethylpyrazoline, diethylpyrazoline, dipropylpyrazoline, dibutylpyrazoline, etc.; pyrrolidine and alkyl-substituted pyrrolidines such as methylpyrrolidine, ethylpyrrolidine, propylpyrrolidine, butylpyrrolidine, dimethylpyrrolidine, diethyl pyrrolidine, dipropylpyrrolidine, dibutylpyrrolidine, etc.; morpholine and alkyl-substituted morpholines such as methylmorpholine, ethylmorpholine, propylmorpholine, butylmorpholine, dimethylmorpholine, diethylmorpholine, dipropylmorpholine, dibutylmorpholine, etc.; amino alkyl-substituted piperazines such as aminomethylpiperazine, aminoethylpiperazine, aminopropylpiperazine, aminobutylpiperazine, aminohexylpiperazine, aminodimethylpiperazine, aminodiethylpiperazine, aminodipropylpiperazine, aminodibutylpiperazine, aminodihexylpiperazine, aminotetramethylpiperazine, etc.; aminoalkyl-substituted imidazolidines such as aminomethylimidazolidine, aminoethylimidazolidine, aminopropylimidazolidine, aminobutylimidazolidine, aminodimethylimidazolidine, aminodiethylimidazolidine, aminodipropylimidazolidine, aminodibutylimidazolidine, etc.; pyrazolidine and aminoalkyl-substituted pyrazolidines such as aminomethylpyrazolidine, amino ethylpyrazolidine, aminopropylpyrazolidine, aminobutylpyrazolidine, aminodimethylpyrazolidine, aminodiethylpyrazolidine, aminodipropylpyrazolidine, aminodibutylpyrazolidine, etc.

The aromatic amine includes aniline, phenylenediamine, diaminotoluene, xylylenediamine, methylenedianiline, diphenyl ether diamine, etc.

The alkylene oxide (hereinafter sometimes referred to briefly as AO) which is used in the addition reaction with said compounds containing active hydrogen atoms includes not only ethylene oxide and propylene oxide (which are sometimes referred to briefly as EO and PO, respectively) but also 1,2-, 1,3-, 1,4-, or 2,3-butylene oxide, styrene oxide, etc., as well as various combinations of such alkylene oxides. Preferred is propylene oxide or a combination of ethylene oxide and propylene oxide.

The mode of addition of such alkylene oxide is not particularly critical and may for example be block addition or random addition. Aside from them, the following modes of addition can be mentioned.

Block adducts available upon addition in the following sequences:

PO-AO (chipped)

PO-AO-PO-AO (balanced)

AO-PO-AO

PO-AO-PO (activity secondary).

Random adducts available upon addition by mixing PO and AO.

Adducts available upon addition in the sequence of AO-EO-PO-AO-EO (as described in Japanese Kokai Publication Sho-57-209920).

Random-block adducts available upon addition in the sequence, for example, described in Japanese Kokai Publication Sho-53-13700.

There can also be mentioned those ethers (e.g. methyl ethers, isopropyl ethers, phenyl ethers, etc.) or esters (e.g. acetic esters, benzoic esters, etc.) which are available upon partial blocking of the hydroxyl groups of polyoxyalkylene polyols with alcohols or carboxylic acids.

The polyester polyol includes condensed polyester polyols, lactone polyester polyols (polymer type), polycarbonate diols, etc.

The condensed polyester polyol includes the polyols available upon dehydrating condensation of dibasic acids with glycol or triol. For example, ethylene adipate, diethylene adipate, butylene adipate, trimethylolpropane adipate, etc. can be mentioned.

The lactone polyester polyol includes but is not limited to the compound available upon ring-opening condensation of ε-caprolactam.

The polycarbonate diol includes but is not limited to compounds available upon phosgenation of polyols or trans-esterification of polyols with diphenyl carbonate.

The polyol having a backbone chain of carbon-carbon bonds includes acrylic polyols, polybutadiene polyols, and polyvinyl alcohols.

In the present invention, said polyether polyol, polyester polyol, polyol having a backbone chain of carbon-carbon bonds, and low-molecular-weight polyol (such as said polyhydric alcohols, which are preferably liquid at atmospheric temperature) can be used in combination. The compound containing phenolic-hydroxyl group includes but is not limited to monocyclic polyphenols such as pyrogallol, hydroquinone, phloroglucinol, etc.; bisphenols such as bisphenol A, bisphenol sulfone, etc.; phenol-formaldehyde condensate (Novolac) such as the polyphenol described in U.S. Pat. No. 3,265,641.

The compound containing carboxyl group includes aliphatic polycarboxylic acids such as adipic acid, succinic acid, sebacic acid, azelaic acid, fumaric acid, maleic acid, dimerized linolenic acid, etc.; aromatic polycarboxylic acids such as phthalic acid, isophthalic acid, terephthalic acid, etc.

The compound containing thiol group includes monothiols such as dodecylmercaptan, mercaptopropionic acid, etc., dithiols such as hexanedithiol, dimercapto-1,8-dioxa-3,6-octane, etc., and polythiols such as reaction products of polyglycidyl compounds with hydrogen sulfide, and esterification products of mercaptopropionic acid or mercaptoglycolic acid with polyalcohols.

The compound containing amino group includes aliphatic amines, alicyclic amines, heterocyclic amines, and aromatic amines. The aliphatic amine includes but is not limited to alkanolamines such as mono-, di-, and tri-ethanolamines, isopropanolamine, aminoethylethanolamine, etc.; alkylamines having 1 to 20 carbon atoms; alkylenediamines having 2 to 6 carbon atoms such as ethylenediamine, propylenediamine, hexamethylenediamine, etc.; and polyalkylenepolyamines such as diethylenetriamine, triethylenetetramine, etc. The alicyclic amine includes isophoronediamine, cyclohexylenediamine, dicyclohexylmethanediamine, etc. The heterocyclic amine includes aminoethylpiperazine and the compounds mentioned in Japanese Kokoku Publication Sho-55-21044. The aromatic amine includes aniline, phenylenediamine, diaminotoluene, xylylenediamine, methylenedianiline, diphenyletherdiamine, etc.

The molecular weight of (A) is generally 100 to 100000, preferably 500 to 50000, and more preferably 1000 to 20000.

When a polyoxyalkylene polyol is selected for (A), one with a hydroxyl value of generally 5 to 280, preferably 10 to 200, and more preferably 20 to 150 can be used.

The water-soluble monomer that can be used in the present invention includes vinyl monomers containing carboxyl group, vinyl monomers containing sulfonic acid group, vinyl monomers containing phosphoric acid group, and the corresponding salts; vinyl monomers containing hydroxyl group, vinyl monomers containing ether group, and vinyl monomers containing ammonium group.

The vinyl monomer containing carboxyl group includes but is not limited to (meth)acrylic acid, crotonic acid, sorbic acid, maleic acid, itaconic acid, cinnamic acid, and the corresponding acid anhydrides, etc.

The vinyl monomer containing sulfonic acid group includes but is not limited to aliphatic or aromatic vinylsulfonic acids [e.g. vinylsulfonic acid, allylsulfonic acid, vinyltoluenesulfonic acid, styrenesulfonic acid, etc.], (meth)acrylsulfonic acids [e.g. sulfoethyl (meth)acrylate, sulfopropyl (meth)acrylate, etc.], and (meth)acrylamidosulfonic acids [e.g. 2-acrylamido-2-methylpropanesulfonic acid etc.].

The vinyl monomer containing phosphoric acid group includes but is not limited to 2-hydroxyethyl (meth)acryloyl phosphate and phenyl 2-acryloyloxyethyl phosphate.

These vinyl monomers can be used in the form of salts of said carboxylic, sulfonic, or phosphoric acid function. Among such salts can be mentioned salts with alkali metals (e.g. sodium, potassium, lithium, etc.), salts with alkaline earth metals (e.g. calcium, magnesium, etc.), ammonium salts, and salts with amines (e.g. alkylamines such as methylamine, trimethylamine, etc. and alkanolamines such as triethanolamine, diethanolamine, etc.). Preferred among them are alkali metal salts and, in particular, the sodium salt and the potassium salt.

The vinyl monomer containing hydroxyl group includes but is not limited to hydroxyethyl (meth)acrylate and hydroxypropyl (meth)acrylate.

The vinyl monomer containing ether group includes but is not limited to ethylene glycol monomethyl ether (meth)acrylate and trioxyethylene glycol (meth)acrylate.

The vinyl monomer containing ammonium group includes but is not limited to N,N,N-trimethyl-N-(meth)acryloyloxyethyl-ammonium chloride and N,N,N-triethyl-N-(meth)acryloyloxyethyl-ammonium chloride.

The precursor of a water-soluble monomer is a compound which becomes water-soluble upon hydrolysis, thus including methyl (meth)acrylate, ethyl (meth)acrylate, 2-ethylhexyl (meth)acrylate, vinyl acetate, and (meth)acrylonitrile.

These species of the water-soluble monomer or the precursor thereof can be used independently or in a combination of two or more. Preferred are vinyl monomers containing carboxyl group.

Among these water-soluble monomers are preferred vinyl monomers containing carboxyl group, vinyl monomers containing sulfonic acid group, and the corresponding salts.

In the present invention, other vinyl monomers can also be used where necessary. Among such other optional vinyl monomers may be mentioned aromatic vinyl monomers such as styrene, α-methylstyrene, hydroxystyrene, chlorostyrene, etc.; unsaturated nitriles such as (meth)acrylonitrile etc.; (meth)acrylic esters such as alkyl (meth)acrylate whose alkyl moieties contain 1 to 30 carbon atoms, hydroxypolyoxyalkylene-ether mono(meth)acrylate, etc.; olefins such as ethylene, propylene, etc., fluorine-containing vinyl monomers such as perfluorooctylethyl methacrylate, perfluorooctylethyl acrylate, etc.; vinyl monomers containing amino group such as diaminoethyl methacrylate, morpholinoethyl methacrylate, etc.; and modified silicone monomers having vinyl groups at both terminus.

Among those monomers, aromatic vinyl monomers, unsaturated nitrites, and (meth)acrylic esters are preferred from the standpoint of copolymerizability and dispersion stability.

The crosslinking agent that can be used in the present invention includes copolymerizable crosslinking agents and other crosslinking agents. The copolymerizable crosslinking agent includes compounds containing two polymerizable double bonds; and compounds containing at least one polymerizable double bond and at least one functional group which is reactive with said water-soluble monomer.

The compound containing two polymerizable double bonds include but is not limited to the following compounds.

① Bis(meth)acrylamide: N,N-alkylene(1 to 6 carbon atoms) bis(meth)acrylamides (e.g. N,N-methylenebisacrylamide).

② Polyesters available upon reaction of a polyol or polyepoxide with an unsaturated mono- or polycarboxylic acid, such as the di- or tri(meth)acrylates or di- or trimaleate which are obtainable from ethylene glycol, trimethylolpropane, glycerol, polyoxyethylene glycol, polyoxypropylene glycol, or cyclohexene diepoxide and either (meth)acrylic acid or maleic acid.

③ Carbamic esters: the carbamic esters available upon reaction of a polyisocyanate [e.g. tolylene diisocyanate, hexamethylene diisocyanate, 4,4'-diphenylmethane diisocyanate, and NCO-containing prepolymers (obtainable by reaction of said polyisocyanates with compound containing active hydrogen atoms)] with hydroxyethyl (meth)acrylate.

④ Polyvinyl compounds: divinylbenzene, divinyltoluene, divinylxylene, divinyl ether, divinyl ketone, trivinylbenzene, etc.

⑤ Di- or poly(meth)allyl ethers of polyols: the poly(meth)allyl ethers of polyols [e.g. alkylene glycols, glycerol, polyalkylene glycols, polyalkylene polyols, carbohydrates, etc.] (such as polyethylene glycol diallyl ether, allyl-starch, allyl-cellulose, etc.).

⑥ Polycarboxylic polyallyl esters: diallyl phthalate, diallyl adipate, etc.

⑦ The esters of unsaturated mono- or polycarboxylic acids with mono(meth)allyl ethers of polyols: (meth)acrylic esters of monoallyl ether of polyethylene glycol etc.

⑧ Polyallyloxyalkanes: tetraallyloxyethane etc.

Referring to said compounds each containing at least one polymerizable double bond and at least one functional group reactive with said water-soluble monomer, the functional group reactive to the carboxyl group, sulfonic acid group, phosphoric acid group, hydroxyl group, or ammonium base in said water-soluble monomer includes hydroxyl group, epoxy group, and tertiary amino group. As such compounds, ethylenically unsaturated compounds containing hydroxyl group [e.g. N-methylol-(meth)acrylamide etc.], ethylenically unsaturated compounds containing epoxy group [e.g. glycidyl (meth)acrylate etc.], and ethylenically unsaturated compounds containing tertiary amino group [e.g. dimethylaminoethyl (meth)acrylate, diethylaminoethyl (meth)acrylate, etc.] can be mentioned.

As other crosslinking agents, polyvalent metal salts such as calcium oxide, zinc diacetate, etc. can be mentioned.

Among the above-mentioned various crosslinking agents, copolymerizable crosslinking agents are preferred and N,N-methylenebisacrylamide, ethylene glycol diacrylate, trimethylolpropane triacrylate, and tetrallyloxyethane are particularly preferred.

The polysaccharide that can be used in the present invention includes starch and cellulose, among others. The starch includes raw starches such as sweet potato starch, white potato starch, wheat starch, corn starch, rice starch, etc. and modified starches such as oxidized starch, dialdehyde starch, starch alkyl ethers, starch aryl ethers, hydroxyalkyl starch, starch aminoethyl ether, etc.

The cellulose mentioned above includes various celluloses available from wood, leaf, stem or cane, bast fiber, comose hair, etc. and modified celluloses such as cellulose alkyl ethers, organic acid esters of cellulose, oxidized cellulose, cellulose hydroxyalkyl ethers, etc.

The dispersion of the present invention can be provided by the following technology. In the following description, said water-soluble monomer or said precursor thereof is referred to briefly as (1), any other vinyl monomer or monomers as (1'), and the crosslinking agent and/or polysaccharide as (2).

① To an aqueous solution or dispersion of (1) and (2), plus (1') where necessary, is added (A) dropwise or, where necessary, a liquid mixture of (A) and an emulsifier dropwise and the mixture is heated, optionally in the presence of a radical polymerization catalyst, or irradiated with radiation, an electron beam, ultraviolet light, or the like.

② To (A) is added an aqueous solution or dispersion of (1) and (2), plus (1') where necessary, dropwise and, thereafter, the mixture is treated in the same manner as described in ①, using a radical polymerization catalyst and an emulsifier where necessary.

③ To a mixture of (A) and water is added an aqueous solution or dispersion of (1) and (2), plus (1') where necessary, dropwise and, thereafter, the mixture is treated in the same manner as described in ①, using a radical polymerization catalyst and an emulsifier where necessary.

④ To a dispersion composed of (A), an emulsifier, and water are added (1) and (2), plus (1') where necessary, dropwise, optionally in the presence of a radical polymerization catalyst and, thereafter, the mixture is treated in the same manner as described in ①.

The proportion of (1) and (2), plus (1') which is an optional ingredient, based on the weight of (A), is generally 2 to 120%, preferably 10 to 100%, and more preferably 30 to 90%.

The proportion of (1), based on the total weight of (1) and (2), plus (1') added optionally, is generally not less than 50%, preferably 60 to 99.9%, and more preferably 75 to 95%.

The proportion of (2), based on the total weight of (1) and (2), plus (1') used optionally, is generally 0.001 to 20%, preferably 0.01 to 10%, and more preferably 0.1 to 5%. When the proportion of (2) is less than 0.001% or exceeds 20%, no sufficient water absorption capacity can be obtained.

The proportion of other vinyl monomer (1'), based on the total weight of (1) and (2), plus (1') used optionally, is generally 0 to 20%, preferably 0 to 10%, and more preferably 0 to 5%.

Based on the weight of the dispersion, the proportion of water should essentially be 5 to 50% and is preferably 5 to 45% and more preferably 10 to 30%. When the proportion of water exceeds 50% or is less than 5%, it is difficult to obtain a dispersion.

The radical polymerization catalyst that can be used includes azo compounds [e.g. azobisisobutyronitrile, azobiscyanovaleric acid, 2,2'-azobis(2-aminodipropane) dihydrochloride, etc.], inorganic peroxides [e.g. hydrogen peroxide, ammonium persulfate, potassium persulfate, sodium persulfate, etc.], organic peroxides [e.g. benzoyl peroxide, di-t-butyl peroxide, cumene perhydroxide, peroxysuccinic acid, di(2-ethoxyethyl)peroxydicarbonate, etc.], redox catalysts [combinations of a reducing agent such as an alkali metal sulfite or bisulfite, ammonium sulfite, ammonium bisulfite, or ascorbic acid with an oxidizing agent such as an alkali metal persulfate, ammonium persulfate, or peroxides], and various combinations of such catalysts. The proportion of the catalyst based on the total weight of (1) and (2), plus (1') used optionally, is generally 0.0005 to 5% and preferably 0.001 to 2%.

The emulsifier includes nonionic surfactants [e.g. lauryl alcohol-ethylene oxide adduct, lauric acid-ethylene oxide adduct, sorbitan monolaurate, stearyl amine-ethylene oxide adduct, nonylphenol-ethylene oxide adduct, etc.], anionic surfactants [e.g. lauryl alcohol sulfate, sodium alkylbenzenesulfonate, aerosol OT, dithiophosphoric ester salts, etc.], cationic surfactants [e.g. laurylamine acetate, monostearate-triethanolamine formate, etc.], and various combinations of such surfactants. Preferred are nonionic surfactants.

The proportion of the emulsifier relative to the dispersion is generally 0 to 10 weight % and preferably 0.1 to 5 weight %.

The dispersed-particle diameter in the dispersion of the present invention is generally 0.01 to 100 $\mu$m, preferably 0.05 to 10 $\mu$m, and more preferably 0.1 to 5 $\mu$m. When the dispersed particle diameter exceeds 100 $\mu$m, the stability of the dispersion is sacrificed, while particles with diameters smaller than 0.01 $\mu$m cause troubles, for example, to undergo aggregation of the particles.

In the present invention, the proportion of (B) relative to the combined weight of (A) and (B) is generally 1 to 70%, preferably 5 to 65%, and more preferably 20 to 60%. When the proportion of the vinyl polymer chain is more than 70%, the system tends to undergo aggregation of particles and be unstable.

The proportion of (A) based on the weight of the dispersion is generally 30 to 99%, preferably 35 to 95%, and more preferably 40 to 80%. When the proportion of (A) is smaller than 30%, the dispersed particles tend to aggregate and give an unstable dispersion.

The dispersion of the present invention can be applied to the production of water-absorbent polyurethane resin. The water-absorbent polyurethane resin can be produced by subjecting the dispersion of the invention, after removal of water where necessary, to reaction with an organic polyisocyanate, optionally in the presence of a urethanation promoting catalyst, a crosslinking agent, a blowing agent, a foam-conditioning agent, etc. This process can be carried out by a known production technology, such as the one-shot process, semi-prepolymer process, prepolymer process, etc.

Shaped articles of water-absorbent polyurethane resin, whether foamed or unfoamed, can be manufactured by conducting the above-mentioned reaction in a closed mold or an open mold using a low-pressure or a high-pressure molding equipment.

As the organic polyisocyanate, a variety of polyisocyanates heretofore used in polyurethane production can be employed. Among such polyisocyanates are aromatic polyisocyanates containing 6 to 20 carbon atoms (exclusive of carbon atoms in the NCO groups) (e.g. 2,4- and/or 2,6-tolylene diisocyanate (TDI), crude TDI, 2,4'- and/or 4,4'-diphenylmethane diisocyanate (MDI), crude MDI [phosgenation product of crude diaminophenyl methane {the condensation product of formaldehyde with an aromatic amine (aniline) or a mixture thereof: a mixture of diaminodiphenylmethane and a small proportion (e.g. 5 to 20 weight %) of a tri- or polyfunctional polyamine}, polyallyl polyisocyanate (PAPI), etc.]; aliphatic polyisocyanates containing 2 to 18 carbon atoms (e.g. hexamethylene diisocyanate, lysine diisocyanate, etc.); alicyclic polyisocyanates containing 4 to 15 carbon atoms (e.g. isophorone diisocyanate, dicyclohexylmethane diisocyanate, etc.); aralkyl polyisocyanates containing 8 to 15 carbon atoms (e.g. xylylene diisocyanate etc.); the corresponding modified polyisocyanates (modification products of said polyisocyanates which contain urethane, carbodiimide, allophanate, urea, biuret, urethodione, uretoneimine, isocyanurate, or oxazolidone group); the other polyisocyanates mentioned in Japanese Kokai Publication Sho-61-76517; and mixtures of two or more of said polyisocyanates. Preferred among them are those polyisocyanates which are readily available from commercial sources, such as 2,4- and 2,6-TDI, mixtures of such isomers, crude TDI, 4,4'- and 2,4'-MDI, mixtures of such isomers, PAPI which is also known as crude MDI, and modified polyisocyanates derived from any of those polyisocyanates and containing any of urethane, carbodiimide, allophanate, urea, biuret, and isocyanurate groups.

The isocyanate index [the equivalent ratio of NCO/group containing active hydrogen atom ×100] for use in the production of polyurethane in accordance with the present invention is generally 80 to 140, preferably 85 to 120, and more preferably 95 to 115. It is possible to introduce polyisocyanurates into the polyurethane by increasing the isocyanate index in a very large measure (e.g. 300 to 1000 or even greater).

The urethanation promoting catalyst that can be used includes the catalysts in routine use for polyurethane production [such as amine catalysts (e.g. tertiary amines such as triethyleneamine, N-ethylmorpholine, etc.), tin catalysts (stannous octanate, dibutyltin dilaurate, etc.), and other metal catalysts (lead octanate etc.)]. The proportion of the catalyst is about 0.001 to about 5% based on the combined weight of the dispersion of the invention and the organic polyisocyanate.

The blowing agent that can be used includes methylene chloride, monofluorotrichloromethane, and water, to name but a few examples.

The foam-conditioning agent includes silicone surfactants (e.g. polysiloxane-polyoxyalkylene copolymer).

The other additive that can be used in the present invention includes the known species of flame retardant, reaction retardant, coloring agent, mold release agent, aging inhibitor, antioxidant, plasticizer, and fungicide, as well as carbon black and other fillers.

BEST MODE OF CARRYING OUT THE INVENTION

The following examples are intended to merely illustrate the present invention in further detail and should by no means be construed as defining the scope of the invention. In the following examples, all parts and percents are parts by weight and percents by weight.

The compositions of the starting materials used in Examples 1 to 5, Application Examples 1 to 4, and Comparative Application Examples 1 to 4 are as follows. Active hydrogen-containing compound (A):

Polyol A1: a polyether polyol (EO content, 13%) with a hydroxyl value of 33 as available on sequential addition of PO and EO in that order to glycerol.

Polyol A2: a polyether polyol with a hydroxyl value of 33 as available upon addition of PO to glycerol.

Polyol A3: a polyether polyol with a hydroxyl value of 55 as available upon addition of PO to glycerol.

Vinyl monomer (1): acrylic acid (Nippon Shokubai)

Copolymerizable crosslinking agent (2): methylenebisacrylamide (Nitto Chemical Industry)

Radical polymerization catalyst: 2,2'-azobis(2-aminodipropane dipropane)dihydrochloride Emulsifier: sorbitan monolaurate Amine catalyst: triethylenediamine (DABCO)

Tin catalyst: stannous octanate (T-9)

Isocyanate: tolylene diisocyanate (TDI-80)

Foam-conditioning agent: a silicone foam-conditioning agent (Nippon Unicar "L-520")

Water-absorbent resin: Sanfresh ST-500TM (Sanyo Chemical Industries, a starch-acrylate graft)

[Determination of Volume-based Particle Diameter]

The water-absorbent resin dispersion was diluted with the same polyoxyalkylene compound as used in the same dispersion to a laser light transmittance of 70 to 90% and using a particle size distribution analyzer (Laser diffraction/scattering particle size distribution analyzer LA-700, Horiba), the dispersion particle diameter was determined. The particle diameters thus determined are shown in Table 2. Each diameter value shown in Table 2 is the particle diameter corresponding to the 50% cumulative distribution of the volume-based particle diameter distribution.

[Evaluation of Moisture Absorption-desorption Kinetics]

The polyurethane foam was allowed to sit in a constant-temperature, constant-humidity chamber controlled at 80% R.H. (25° C.) and the time course of moisture absorption was determined. Thereafter, the foam was allowed to sit in the constant-temperature, constant-humidity chamber controlled at 40% R.H. (25° C.) and the time course of moisture desorption was determined. The amounts of water absorption and desorption are expressed in the amount (in grams)

of water absorbed and desorped per 50000 cubic centimeters of apparent polyurethan foam volume.

The amount of absorption and the absorption rate were determined using deionized water as follows.

[Amount of Absorption]

One gram of the absorbent sample was placed in a 250-mesh nylon tea bag, which was then immersed in a large excess of 0.9% isotonic sodium chloride solution. After 1 hour of absorption, the tea bag was taken out, drained for 15 minutes, and weighed to find the weight gain. This weight gain value was regarded as the amount of absorption.

[Absorption Rate]

One gram of the absorbent sample was placed in a 250-mesh nylon tea bag, which was then immersed in a large excess of isotonic sodium chloride solution. After 2 minutes of absorption, the tea bag was taken out, drained for 15 minutes, and weighed to find the weight gain. The weight gain value thus found was taken as the absorption rate.

EXAMPLE 1 to 5

In a 1L four-necked flask fitted with a temperature regulator, vacuum stirrer, nitrogen inlet, and exit port, water, sodium hydroxide, vinyl monomer (1), copolymerizable crosslinking agent (2), radical polymerization catalyst, and emulsifier were admixed at a temperature not exceeding 40° C. according to the amount presented in Table 1. Then, under agitation, polyol A1 and/or A2 was added portionwise in the total amount indicated in Table 1 to prepare a W/O emulsion. Then, under agitation at 50–80° C., the polymerization of vinyl monomer (1) was carried out to provide a water-absorbent resin dispersion (D1-D5).

EXAMPLE 6

A 2L four-necked flask fitted with a temperature regulator, vacuum stirrer, nitrogen inlet, and exit port was charged with 350 parts of 25% aqueous sodium hydroxide solution and 200 parts of vinyl monomer (1) (acrylic acid available from Nippon Shokubai) at a temperature not exceeding 40° C., and after agitation to mix, 0.02 part of copolymeric crosslinking agent (2) (methylenebisacrylamide available from Nitto Chemical Industry) was added. The whole mixture was further stirred to prepare a homogeneous solution (①). Separately, in a 500 ml Erlenmeyer's flask, 400 parts of polyoxyalkylene compound (A) [a polyether polyol (EO content 20%) (Sannix KC-209, Sanyo Chemical industries) with an hydroxy value of 34 as available upon sequential addition of propylene oxide (PO) and ethylene oxide (EO) in that order to glycerol] and 4 parts of emulsifier (Emulmin 140, Sanyo Chemical Industries) were stirred to give a homogeneous solution (②). While solution (①) was stirred at a temperature not exceeding 40° C. with nitrogen gas being bubbled through it, solution (②) was continuously added over 1 hour to provide a W/O emulsion. To this emulsion was added a solution prepared beforehand by dissolving 0.02 part of radical polymerization catalyst (ADVN, Otsuka Chemical) in 0.1 part of toluene, and the composition was heated at 50° C. under agitation to provide a water-absorbent resin dispersion (D6).

EXAMPLE 7

The procedure of Example 6 was repeated except that the following compound was used, in lieu of the polyoxyalkylene compound used in Example 6, in the amount indicated below to provide a water-absorbent resin dispersion (D7).

Polyoxyalkylene chain-containing compound: a polyether polyol (EO content 70%) (Sannix FA-103, Sanyo Chemical Industries) with an hydroxy value of 50 as available upon sequential addition of PO and EO in that order to glycerol= 600 parts.

EXAMPLE 8

The procedure of Example 6 was repeated except that 2-acrylamide-2-methylpropanesulfonic acid was used in lieu of the vinyl monomer used in Example 6 to provide a water-absorbent resin dispersion (D8).

The particle diameter and viscosity values of the dispersions D6 to D8 obtained in Examples 6 to 8 are presented in Table 2.

TABLE 1

| Dispersion | Example | | | | |
|---|---|---|---|---|---|
|  | 1 | 2 | 3 | 4 | 5 |
| Vinyl monomer (1) | 120 | 120 | 170 | 170 | 120 |
| Copolymerizable crosslinking agent (2) | 3 | 3 | 3 | 3 | 3 |
| Water | 190 | 190 | 190 | 190 | 190 |
| Sodium hydroxide | 50 | 50 | — | — | 50 |
| Radical polymerization catalyst | 2 | 2 | 2 | 2 | 2 |
| Emulsifier | 40 | 40 | 40 | 40 | 40 |
| Polyol A1 | 600 | — | — | 600 | 300 |
| Polyol A2 | — | 600 | 600 | — | 300 |
| Polymerization temperature (°C.) | 70 | 70 | 70 | 70 | 70 |
| Polymerization time (hr) | 4 | 4 | 4 | 4 | 4 |
| Viscosity | 5000 | 5200 | 6900 | 5300 | 5100 |
| Volume-based mean particle diameter ($\mu$m) | 1.5 | 5.0 | 53.9 | 1.0 | 2.8 |

TABLE 2

|  | Volume-based mean particle diameter ($\mu$m) | Viscosity (CPS/25° C.) |
|---|---|---|
| Example 6 | 0.88 | 8200 |
| Example 7 | 1.27 | 5200 |
| Example 8 | 0.52 | 4800 |

Application Example 1

Dispersion D1, polyol A3, water, DABCO, and L-520 were taken in the amounts indicated in Table 3 and mixed and the mixture was adjusted to about 25° C. Then, T-9 was added in the amount indicated in Table 3 and the mixture was stirred for 10 seconds. To this mixture was added TDI-80, adjusted to 25° C. beforehand, in the amount indicated in Table 3, followed by 7 seconds of stirring to provide a polyurethane foam F1. The foam characteristics (foam density, water absorption-desorption ability) of this polyurethane foam are shown in Table 4.

Application Examples 2 to 4

The dispersion obtained in Example 6, 7, or 8, water, DABCO, and L-520 were taken in the amounts indicated in Table 3 and mixed and the mixture was adjusted to about 25° C. Then, T-9 was added in the amount indicated in Table 3 and the mixture was stirred for 10 seconds. To this mixture was added TDI-80, adjusted to 25° C. beforehand, in the amount indicated in Table 3, followed by 7 seconds of stirring to provide a polyurethane foam F2 to 4. The foam characteristics (foam density, 0.9% isotonic sodium chloride solution absorption amount and rate) of this polyurethane foam are shown in Table 5.

Comparative Application Examples 1 and 2

Polyurethane foams F5 and F6 of Comparative Application Examples 1 and 2 were provided using the components indicated in Table 3 by the same procedure as Application Example 1. The foam characteristics (foam density and water absorption-desorption ability) of these polyurethane foams are shown in Table 4.

Comparative Application Examples 3 and 4

Polyurethane foams F7 and F8 were prepared by using the same polyoxyalkylene compound as used in Example 7 (designated Polyol A4) according to the amount indicated in Table 3 by otherwise the same procedure as Application Examples 2 to 4. The foam characteristics (foam density, 0.9% isotonic sodium chloride solution absorption amount and rate) of the resulting polyurethane foams are shown in Table 5.

TABLE 3

|  | F1 | F2 | F3 | F4 | F5 | F6 | F7 | F8 |
|---|---|---|---|---|---|---|---|---|
| Dispersion D1 | 82.5 | — | — | — | — | — | — | — |
| Dispersion D6 | — | 92.5 | — | — | — | — | — | — |
| Dispersion D7 | — | — | 92.9 | — | — | — | — | — |
| Dispersion D8 | — | — | — | 91.8 | — | — | — | — |
| Water-absorbent resin | — | — | — | — | 9.0 | — | — | 27.9 |
| Polyol A1 | — | — | — | — | 73.5 | 50.0 | — | — |
| Polyol A3 | 50.0 | — | — | — | 50.0 | 50.0 | — | — |
| Polyol A4 | — | — | — | — | — | — | 91.0 | 65.0 |
| Water | 4.5 | 0.2 | 0.1 | 0.1 | 4.5 | 4.5 | 0.1 | 0.1 |
| DABCO | 0.1 | 0.1 | 0.1 | 0.1 | 0.1 | 0.1 | 0.1 | 0.1 |
| L-520 | 1.2 | 1.0 | 1.0 | 1.0 | 1.2 | 1.2 | 1.0 | 1.0 |
| T-9 | 0.5 | 0.09 | 0.05 | 0.14 | 0.5 | 0.5 | 0.03 | 0.05 |
| TDI-80 | 54.8 | 6.2 | 5.9 | 6.9 | 54.8 | 54.8 | 7.9 | 5.9 |

TABLE 4

|  | F1 | F5 | F6 |
|---|---|---|---|
| Foam density(kg/cm$^3$) | 18.4 | 18.8 | 21.8 |
| Amount of absorption |  |  |  |
| (2 hr) | 41 | 30 | 6 |
| (4 hr) | 57 | 42 | 6 |
| (6 hr) | 60 | 43 | 7 |
| (21 hr) | 56 | 43 | 7 |
| Amount of desorption (1.5 hr) | 56 | 43 | 7 |

TABLE 5

|  | Foam density (g/cm$^3$) | Amount of absorption (g/g) | Absorption rate (g/g) |
|---|---|---|---|
| F2 | 0.23 | 24 | 23 |
| F3 | 0.48 | 30 | 29 |
| F4 | 0.39 | 41 | 39 |
| F7 | 0.42 | 2 | 1 |
| F8 | 0.45 | 9 | 6 |

It is apparent from Table 4 and 5 that use of the highly water-absorbent dispersion of the invention resulted in a dramatic improvement in the water absorption capacity of polyurethane foam.

Industrial Applicability

As described in detail above, the highly water-absorbent dispersion of the present invention is a uniform dispersion of water-absorbent resin in a microfine particulate form not exceeding 100 μm in diameter and has excellent dispersion stability. Moreover, by applying the dispersion of the invention toe production of polyurethan resin, a highly water-absorbent urethane resin can be obtained. This polyurethane exhibits excellent water absorption ability (amount of absorption and absorption rate).

Offering the above meritorious effects, the water-absorbent resin dispersion and absorbent products according to the present invention are of use as a variety of sanitary products such as paper diapers and napkins and other absorbent products. They also find application, with remarkable performance characteristics, in the fields of sealants, antistaling matrices for fresh vegetables and fruits, drip absorbent trays or sheets, water or humidity modulators, rice plant nursery sheets, concrete cure sheets, and water cutoff materials for communications and optical fiber cables.

We claim:

1. A water-absorbent resin dispersion comprising water-absorbent resin (B) or a hydrous gel thereof dispersed in at least one liquid or heat-meltable polyol (A) having a molecular weight of 500 to 50,000 selected from the group consisting of polyether polyol, polyester polyol, polybutadiene polyol and acrylic polyol, wherein said (B) is formed upon in situ polymerization of a water-soluble vinyl monomer or a precursor thereof and a crosslinking agent in a W/O emulsion prepared by addition of said (A), the proportion of (B) relative to the combined weight of (A) and (B) being 1 to 70 wt %, and either said (B) or said hydrous gel thereof dispersed in said (A) having a mean particle diameter of 0.01 to 100 μm.

2. The dispersion according to claim 1 wherein said (B) or said hydrous gel thereof is formed in said (A) by in situ polymerization of at least one vinyl monomer having a carboxyl or sulfonic acid group and a copolymerizable crosslinking agent, optional together with one or more other vinyl monomers, in the presence of water.

3. The dispersion according to claim 2 wherein the proportion of water available in the formation of said (B) or said hydrous gel thereof is 5 to 50 weight % based on the total weight of said (A), (B), and water.

4. The dispersion according to claim 2 wherein said (B) or said hydrous gel thereof has been formed by in situ polymerization in the presence of an emulsifier as well as said water.

5. A polyurethane composition comprising a water-absorbent resin (B) or a hydrous gel thereof dispersed in a polyurethane with a mean dispersoid particle diameter of 0.01 to 100 μm, wherein said (B) is formed upon in situ polymerization of a water-soluble vinyl monomer or a precursor thereof, and a crosslinking agent in a W/O emulsion prepared by addition of a least one liquid or heat meltable polyol having a molecular weight of 500 to 50,000 which is selected from the group consisting of polyether polyol, polyester polyol, polybutadiene polyol and acrylic polyol, which is a precursor of said polyurethane.

6. A process for producing a polyurethane resin which comprises subjecting the dispersion claimed in claim 1 to reaction with an organic polyisocyanate compound.

7. A process for producing a polyurethane foam which comprises subjecting the dispersion claimed in claim 1 to reaction with an organic polyisocyanate compound in the presence of a blowing agent, optionally together with a catalyst, a foam-conditioning agent, and other additives.

* * * * *